United States Patent
Kawana et al.

[11] Patent Number: 5,499,150
[45] Date of Patent: Mar. 12, 1996

[54] MAGNETIC HEAD

[75] Inventors: Jiro Kawana; Katsuaki Kanaya, both of Hanamaki, Japan

[73] Assignee: Matsushita Electric Industrial Co., Ltd., Osaka, Japan

[21] Appl. No.: 328,567

[22] Filed: Oct. 24, 1994

Related U.S. Application Data

[63] Continuation of Ser. No. 55,304, May 3, 1993, abandoned.

[30] Foreign Application Priority Data

May 11, 1992  [JP]  Japan ..................... 4-117190

[51] Int. Cl.⁶ .................................. G11B 5/17
[52] U.S. Cl. ........................................ 360/123
[58] Field of Search ...................... 360/123, 125, 360/119, 77.07, 77.11; 336/132, 137, 183, 188

[56] References Cited

U.S. PATENT DOCUMENTS

| | | | |
|---|---|---|---|
| 2,475,421 | 7/1949 | Camras | 360/123 |
| 3,697,705 | 10/1972 | Holt | 360/123 |
| 5,021,910 | 6/1991 | Murakami | 360/123 |

OTHER PUBLICATIONS

IBM Technical Disclosure Bulletin, Write-Wide, Read Narrow Magnetic Head, vol. 4 No. 10 Mar. 1962.

*Primary Examiner*—Stuart S. Levy
*Assistant Examiner*—Allen Cao
*Attorney, Agent, or Firm*—Stevens, Davis, Miller & Mosher

[57] ABSTRACT

It is an object of the present invention to decrease imbalance of a recording magnetic field of a read/write head generated due to leakage of an erase magnetic field of an antecedent erase head, and to decrease the error rate at a time of reading data. The number of turns of a second read/write coil generating a magnetic field for recording data having one polarity in a direction opposite to that of a leakage magnetic field generated by an erasing coil is made smaller than that of a first read/write coil generating a magnetic field for recording data having the other polarity in the same direction as the leakage magnetic field, whereby rise time of a recording electric current flowing in the second read/write coil is shortened and a magnetic field thus generated is made stronger than the magnetic field generated by the first read/write coil, thus reducing the influence of the leakage magnetic field so as to enable uniform writing of data having both polarities and decreasing an error rate at a time of reading the recorded data.

6 Claims, 2 Drawing Sheets

$H_1 < H_2$
$H_1 + H_3 \fallingdotseq H_2 - H_3$ $$H_1 = H_2$$
$$H_1 + H_3 > H_2 - H_3$$

MAGNETIC HEAD

This application is a continuation of application Ser. No. 08/055,304, filed May 3, 1993 (abandoned).

BACKGROUND OF THE INVENTION

1. Field of the Invention

The present invention relates to a magnetic head used in a magnetic recorder such as a floppy disk drive or the like.

2. Description of the Related Art

FIGS. 2a–2c show a structure of a conventional magnetic head, in which FIG. 2a is a plane view thereof, FIG. 2b is an enlarged view of a portion B in FIG. 2a and FIG. 2c is a diagram showing a recorded pattern on a track in a recording medium.

In FIGS. 2a and 2b, there are provided an erase gap 5 on the left and a read/write gap 6 on the right of the center of a lower part of a core 1 forming a magnetic circuit. An erasing coil 2 for generating a DC magnetic field $H_E$ upon the erase gap 5 for erasing data which have been already recorded on the recording medium is wound around a left arm of the core 1. Further, a first read/write coil 13 for generating a magnetic field $H_1$ upon the read/write gap 6 for recording data having one polarity in the recording medium and a second read/write coil 14 for generating a magnetic field $H_2$ in an opposite direction to the magnetic field HI for recording data having a polarity opposite to the above-mentioned polarity are wound around a right arm of the core 1. The first read/write coil 13 and the second read/write coil 14 have the same number of turns.

In a conventional magnetic head having such a structure as described above, in the case of an antecedent erase system, an electric current flows in the erasing coil 2 so as to erase the data, which have already been recorded on the medium, by saturating the medium with the DC magnetic field $H_E$ upon the erase gap 5. Next, the erased part of the medium proceeds to the read/write gap 6, and is magnetized to the right or to the left by the magnetic field HI or the magnetic field $H_2$ generated by an electric current applied to either one of the first read/write coil 13 or the second read/write coil 14. A reference numeral 17 in FIG. 2c represents a recorded pattern on a track in the recording medium. Since the moving direction of the medium is to the right, recording is made gradually from the right portion to the left in the figure.

In the conventional magnetic head described above, however, when the antecedent erase system is adopted, the recording magnetic field is affected by a bias magnetic field $H_3$ which is leakage from the DC magnetic field $H_E$ generated by the erase current to the read/write gap 6, wherein the recording magnetic field to the right becomes stronger by being added with the bias magnetic field $H_3$ and the recording magnetic field to the left becomes weaker by being deducted by the bias magnetic field $H_3$. Therefore, there has been such a problem that imbalance due to the direction, i.e., asymmetry is produced in the intensity of magnetization recorded on the recording medium, and an error rate is increased at a time of reading the recorded data unless an asymmetrical circuit for correcting the imbalance is used.

SUMMARY OF THE INVENTION

It is an object of the present invention to provide an excellent magnetic head which solves such problems heretofore experienced without using the asymmetrical circuit.

In order to achieve the above-mentioned object, according to the present invention, the number of turns of a read/write coil on the side of generating a magnetic field having a direction opposite to that of the bias magnetic field produced by the erase current is decreased to less than the number of turns of a read/write coil on the same side of generating a magnetic field having the direction as that of the bias magnetic field.

The intensity of a recording magnetic field generated by a magnetic head is in proportion to a recording electric current flowing in a coil, but a stray capacity is normally added to the coil in parallel therewith, and an electric current applied from a recording amplifier is divided to flow into the coil and the stray capacity. So, when the number of turns of the coil is reduced, the inductance of the coil becomes smaller, and the impedance of the stray capacity becomes larger. Accordingly, the recording electric current flowing in the coil increases, particularly in high frequency components such as a leading edge of a pulse, thus making it possible to shorten the rise time of the recording electric current. Thus, according to a magnetic head structured as described above, it is possible to shorten the rise time of the recording magnetic field thereby to intensify magnetization in a direction opposite to that of the bias magnetic field generated by the erasing coil 2 relative to that in the same direction as the bias magnetic field. Hence, there is an effect of reducing the influence of the imbalance of the recording magnetic field owing to the bias magnetic field. As a result, it is possible to reduce the imbalance due to the direction, i.e., asymmetry in the intensity of magnetization recorded in the medium, thus reducing the error rate at a time of reading the recorded data.

BRIEF DESCRIPTION OF THE DRAWINGS

FIG. 1b is an enlarged view of a part A in FIG. 1a;

FIG. 2b is an enlarged view of a part B in FIG. 2a; and

DESCRIPTION OF THE PREFERRED EMBODIMENTS

Figure 1A:
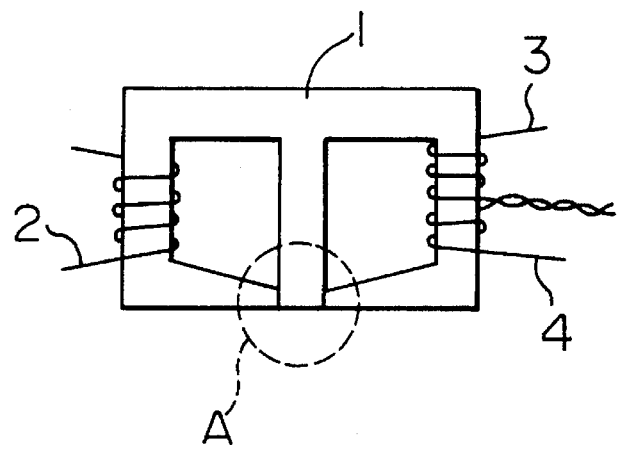
FIG. 1a is a plane view of a magnetic head according to the present invention.
Figure 1B:
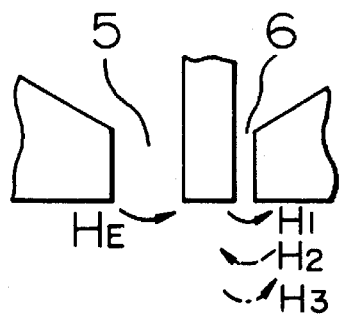
Figure 1C:
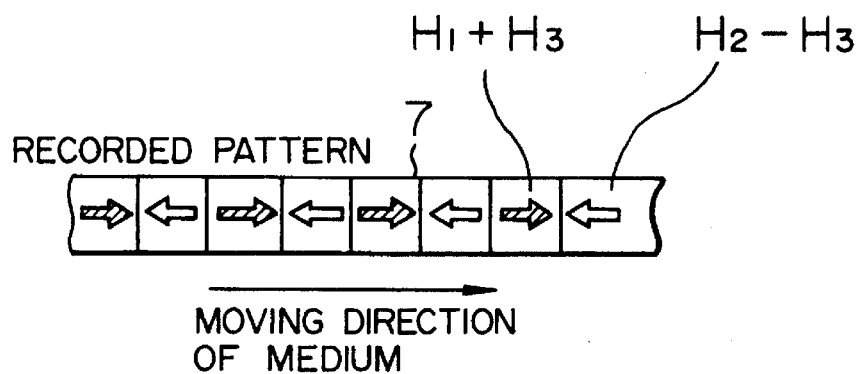
FIG. 1c is a schematic diagram showing a recorded pattern on a track in a recording medium recorded by a magnetic head according to the present invention.
Figure 2A:
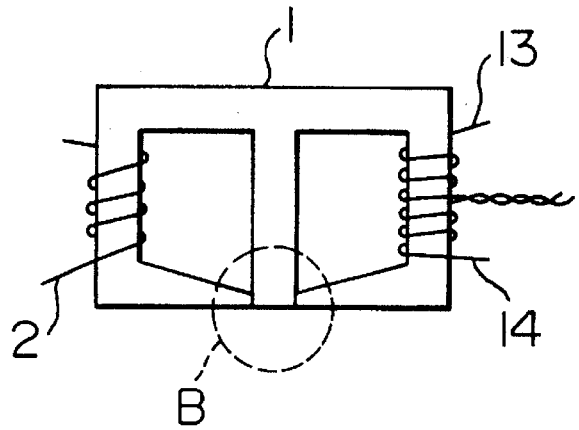
FIG. 2a is a plane view of a conventional magnetic head.
Figure 2B:
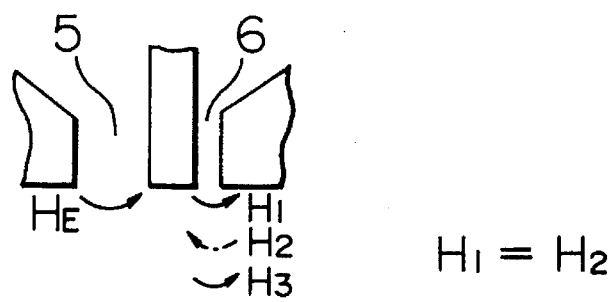
Figure 2C:
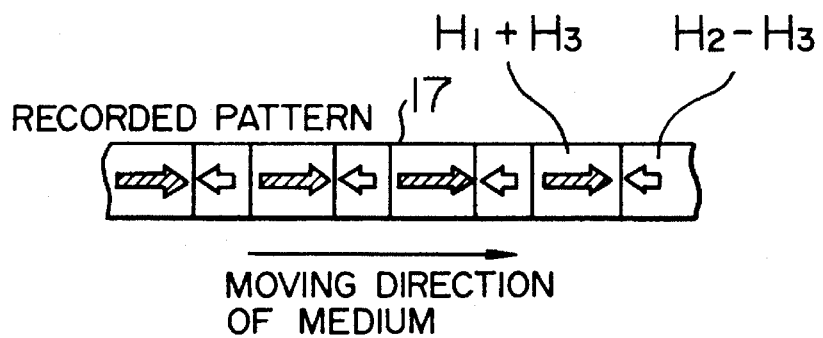
FIG. 2c is a schematic diagram showing a recorded pattern on a track in a recording medium recorded by a conventional magnetic head.

FIGS. 1a–1c show a structure of an embodiment of a magnetic head according to the present invention, in which FIG. 1a is a plane view thereof, FIG. 1b is an enlarged view of a part A in FIG. 1a, and FIG. 1c is a diagram showing a recorded pattern on a track in a recording medium. In FIGS. 1a and 1b, a reference numeral 1 represents a core for forming a magnetic circuit, and a numeral 2 represents an erasing coil for generating a DC magnetic field $H_E$ upon an erase gap 5 for erasing data recorded on a surface of a medium 7. A numeral 3 represents a first read/write coil for generating a magnetic field $H_1$ upon a read/write gap 6 for recording data having one polarity on the surface of the medium 7, and a numeral 4 represents a second read/write coil for generating a magnetic field $H_2$ in an opposite direction to the magnetic field $H_1$ for recording data having a polarity opposite to the above-mentioned polarity. In the present embodiment, the number of turns of the second read/write coil 4 is made less than the number of turns of the first read/write coil 3.

In the next place, the operation of the embodiment described above will be explained. In the case of an antecedent erase system, an electric current flows in the erasing coil 2, and information which has already been written on the medium is erased by the DC magnetic field $H_E$. At this time, however, a leaking bias magnetic field $H_3$ is produced at the same time upon a read/write gap portion. In order to write the data on the medium 7, electric currents flow in the first read/write coil 3 and the second read/write coil 4 in accordance with the polarity of the data to generate a magnetic field $H_1$ and a magnetic field $H_2$ respectively upon the read/write gap portion. At this time, since the number of turns of the second read/write coil 4 for generating the magnetic field $H_2$ in a direction opposite to that of the bias magnetic field $H_3$ is made less than the number of turns of the first read/write coil 3, an inductance of the second read/write coil 4 is lowered, and an impedance of its stray capacity in parallel therewith is increased. Hence, a rise time of the recording electric current flowing in the second read/write coil 4 is shortened. Accordingly, it is possible to intensify the magnetic field $H_2$ to be stronger than the magnetic field $H_1$, particularly in rise of a pulse or the like. And it becomes possible to correct an influence of the bias magnetic field $H_3$ so as to bring two kinds of recording magnetic fields on the medium 7 to be almost equal in both directions; namely, $H_1+H_3 \approx H_2-H_3$.

This reduces the asymmetry in the intensity of magnetization, and obtains an effect that the error rate can be decreased at a time of reading the recorded data.

As it is apparent from the preferred embodiment described above, in a magnetic head according to the present invention, erasing and recording can be made at the same time, and a rise time of the recording current flowing in one of two coils for recording two types of data having different polarities is shortened to intensify magnetization by decreasing the number of turns to be less than the number of turns of the other coil by a predetermined number of turns, thus reducing imbalance of a recording magnetic field owing to a bias magnetic field produced by the erase magnetic field leaking upon the recording gap portion. Accordingly, recording can be made uniformly irrespective of the polarity of data without using a special correction circuit, thereby to decrease the error rate at a time of reading the recorded data.

We claim:

1. A magnetic head, comprising:

a core having a read/write gap and an erase gap which are adjacent to each other;

a first coil having a first number of turns and wound around a first part of said core for generating, when a first recording current flows in said first coil, a first recording magnetic field in a first direction upon said read/write gap;

a second coil having a second number of turns and wound around a second part of said core adjacent to said first part of said core for generating, when a second recording current flows in said second coil, a second recording magnetic field in a second direction, which is opposite to said first direction, upon said read/write gap; and a third coil wound around a third part of said core for generating, when a DC erasing current flows in said third coil, an erase magnetic field in said first direction upon said erase gap;

said second number of turns being less than said first number of turns by a predetermined number of turns so that said second coil has an inductance lower than an inductance of said first coil and a stray capacitance lower than a stray capacitance of said first coil, whereby a rise time of said second recording current is shorter than a rise time of said first recording current so as to correct an influence of a leaking bias magnetic field from said third coil which causes asymmetry of magnetization on a recording medium when each of said first and second recording currents flows simultaneously which said DC erasing current;

wherein:

said core comprises a read/write side portion, a center portion and an erase side portion;

said read/write gap is formed between said read/write side portion and said center portion;

said erase gap is formed between said erase side portion and said center portion;

said first part and said second part of said core are provided on said read/write side portion; and said third part of said core is provided on said erase side portion.

2. A magnetic head as in claim 1, wherein:

said first recording magnetic field has a first magnitude $H_1$; said second recording magnetic field has a second magnitude $H_2$; and $H_1 < H_2$ at a rising point of a pulse signal in each of said first and second recording currents.

3. A magnetic head as in claim 2, wherein:

said leaking bias magnetic field has a third magnitude $H_3$; and $H_1+H_3 \approx H_2-H_3$ at said rising point of said pulse signal in each of said first and second recording currents.

4. A magnetic head as in claim 1, further comprising means, operative when said magnetic head writes data on said recording medium, for causing said first recording current and said second recording current to flow in alternation in accordance with said data.

5. A magnetic head as in claim 1, wherein the second recording current has a high-frequency component which is greater than a high-frequency component of the first recording current.

6. A magnetic head as in claim 5, wherein:

the high-frequency component of the first recording current comprises a leading edge of a pulse of the first recording current; and the high-frequency component of the second recording current comprises a leading edge of a pulse of the second recording current.

* * * * *